April 9, 1963    J. DUNGLER    3,084,448
THERMAL TREATMENTS AT HIGH PRESSURE
Filed Oct. 20, 1959    4 Sheets-Sheet 1

INVENTOR:
JULIEN DUNGLER
BY Leon M. Strauss
AGT.

April 9, 1963 J. DUNGLER 3,084,448
THERMAL TREATMENTS AT HIGH PRESSURE
Filed Oct. 20, 1959 4 Sheets-Sheet 2

INVENTOR:
JULIEN DUNGLER
BY Leon M. Strauss
AGT.

April 9, 1963 J. DUNGLER 3,084,448
THERMAL TREATMENTS AT HIGH PRESSURE
Filed Oct. 20, 1959 4 Sheets-Sheet 3
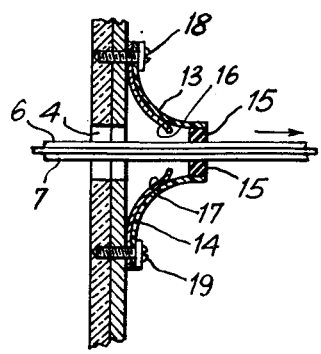
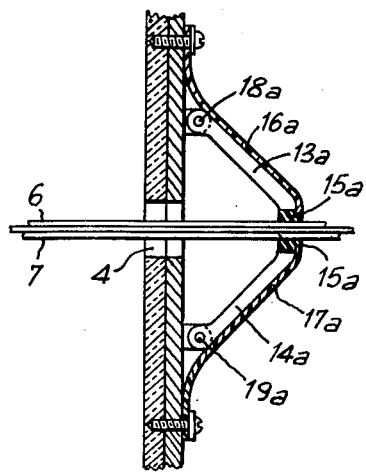
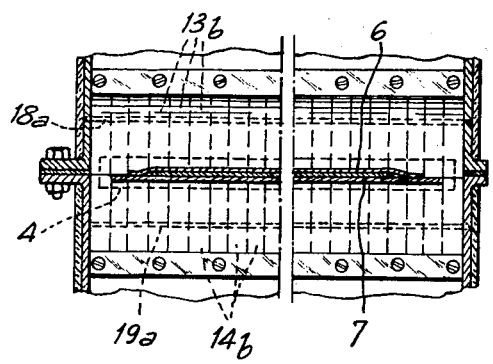
INVENTOR:
JULIEN DUNGLER April 9, 1963 J. DUNGLER 3,084,448
THERMAL TREATMENTS AT HIGH PRESSURE
Filed Oct. 20, 1959 4 Sheets-Sheet 4

INVENTOR:
JULIEN DUNGLER 3,084,448
THERMAL TREATMENTS AT HIGH PRESSURE
Julien Dungler, Rittergasse 35, Basel, Switzerland
Filed Oct. 20, 1959, Ser. No. 847,552
Claims priority, application France Oct. 22, 1958
5 Claims. (Cl. 34—155)

The thermal treatment of the products in strips or the like susceptible of being treated whilst being conveyed, can be effected in qualitatively more favourable conditions and within a considerably shorter period of time, if instead of using the atmospheric pressure the treatments are effected in an enclosure maintained under pressure.

Amongst the treatments concerned may be mentioned the drying, vaporising, fixing, polymerising, defermenting, bleaching and so on of cloth, padding, paper, cardboard, plastics and the like.

According to the kinetic law of chemical reactions, it appears that for each rise in the temperature of reaction by 10° C. there corresponds a diminution of 50% during the chemical reaction.

So far as physical treatments, such as drying are concerned, they are also intensified as and when the boiling temperature of the liquid of impregnation increases. This temperature can be reached in the drying by convection when the operation is effected in an atmosphere of condensible fluid, such as the vapour of water for instance.

The difficulty met in the functioning of this type of machine rests in the introduction and extraction, during continuous working, of products treated inside and outside a treatment chamber maintained at a pressure that is different to the atmospheric pressure.

Devices exist for transferring from an atmosphere at normal pressure to an atmosphere at high pressure such devices having two endless bands between which the material to be treated is introduced into a chamber under pressure and two other endless bands for effecting its removal. It is assumed that the material is protected against any excessive effect by the two bands which cover it across its whole width whilst it passes from one zone to the other, the sealing being obtained by means of inflatable joints of which is equal to twelve in all, as each passage, whether individual or double of the bands, requires the use of two joints.

Another difficulty lies in the correct guidance of the material from the moment when it leaves the introduction bands, to the moment when it is engaged between the removal bands.

The invention has reference to a high pressure chamber having two bands that simultaneously effect the introduction, the removal end, if necessary, the guidance of the material through the treatment chamber, the passage of the said bands by reference, being so effected that only one twin-passage is needed across the entrance-slit through which the material is introduced and only one twin-passage of the two bands through which the material is delivered from the treatment chamber, the return passage of the bands being effected at the exterior of the treatment chamber under pressure. The sealing of the admission and delivering slits is effected by means of heel-joints the effectiveness of which is secured by the difference of pressure prevailing in the treatment chamber and the ambient atmosphere.

Other characteristics and advantages appear from the description which follows.

Reference is made to the attached drawings in which:

FIGURE 3 shows a variant in which the strip material follows an independent passage between the two endless bands;

FIGURE 5 is a detail view of the device for effectively sealing the inlet and the outlet slits of the chamber;

FIGURE 6 shows a modified construction of the means for effecting the sealing;

FIGURE 7 is a front elevation of another construction of the means for effecting the sealing.

Figure 1:
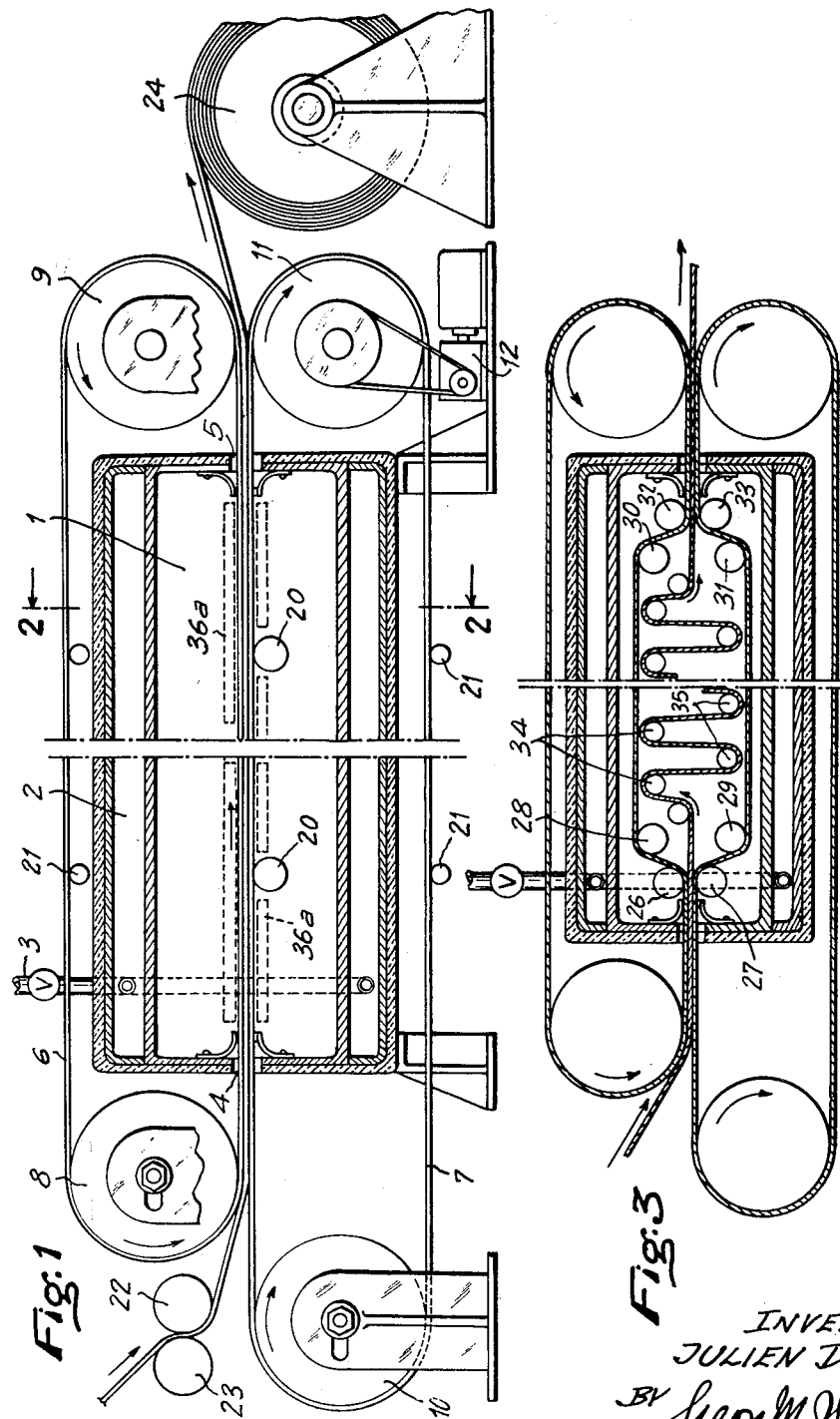
FIGURE 1 is a longitudinal section through a high pressure chamber, of rectangular shape.
Figure 2:
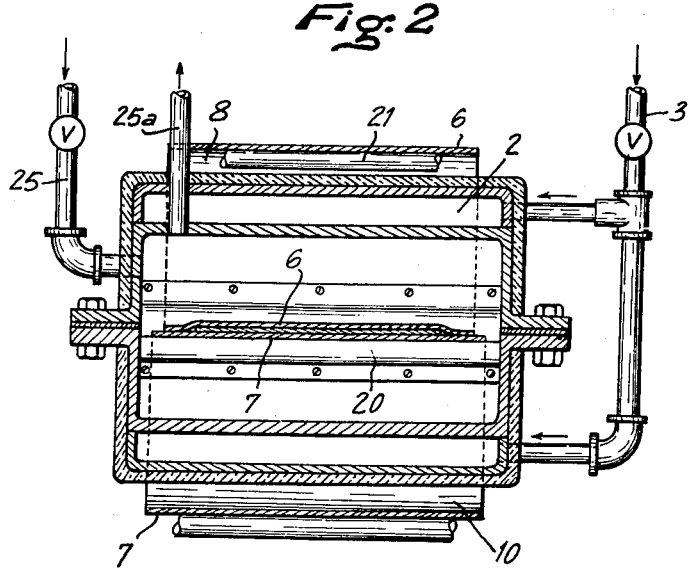
FIGURE 2 is a cross section of this chamber.

In FIGURES 1 and 2 the high pressure chamber 1 has double walls separated by the space 2, through which is circulated the vapour for transmitting heat to the atmosphere prevailing inside the treatment chamber 1 which vapour is supplied through the conduit 3.

Other means for heating can, of course, be provided, such as heating by electrical resistance, gas burners by fuel oil or the like.

The thermal chamber is provided with an inlet slit 4 and an outlet slit 5. Two endless bands 6 and 7 pass through these slits being diverted respectively at the front and rear of the chamber by drums or rollers 8, 9, 10 and 11. FIGURES 1 and 2 show a chamber arranged horizontally. It is however possible to make a similar arrangement in a chamber placed otherwise than horizontal.

The front drums 8 and 10 are adjustable in position and are provided with stretching devices to enable the two bands to be stretched as may be necessary for the correct functioning and for regularising the effects of expansion.

The drum 11 of fixed location, is driven by the variable speed drive device 12 and the drum 9, also of fixed location, is driven by a train of gear wheels, one of which is mounted on the shaft of this drum and the other on the shaft of the drum 11.

The sealing of the inlet and outlet slits is effected by means of two elastic jointing elements 13 and 14 as shown in FIGURE 5. One of the edges of the element 13 is connected to the partition above the slit while one of the edges of the element 14 is mounted on the partition below the slit, the free edges of the two jointing elements resting respectively on the upper and lower surfaces of the bands.

The edges of these jointing elements preferably are provided with strips 15 of a self-lubricating material, having a low co-efficient of friction such for instance as "Teflon." The joints could be held, or reinforced, by elastic metal supports 16 and 17 which are attached to the partition or wall conjointly with the jointing elements by means of screws 18 and 19.

It is also possible to superimpose several jointing elements mounted in the same manner.

The modified construction of the means for effecting sealing as shown in FIGURE 6 consists in replacing the flexible jointing elements 13 and 14 by rigid jointing elements that are mounted on the wall formed with the slit, either by hinges 18a and 19a, or by a flexible joining member.

The effective sealing of the endless bands 6 and 7 on the one hand, and the elements 13a and 14a on the other hand, is secured by strips 15a formed of a material having a low co-efficient of friction.

The full effect of the sealing, in particular at the level of the hinges 18a and 19a, is secured by flexible strips 16a and 17a, which extend over and cover up the rigid jointing elements 13a and 14a.

Instead of the jointing element being formed of a single piece covering the whole of the width of the slit as shown in FIGURE 7 each jointing element can be made of narrow segments 13b and 14b, which enables their application to be facilitated in case of irregularity in thickness of the bands, and in particular enables the sealing on the edges of the bands 6 and 7 to be assured. In place of the friction strips 15a it is possible to use pivoted rollers supported on the outside surfaces of the endless bands.

The lower band 7 is supported by intermediate rollers 20 during its passage through the interior of the chamber. These rollers can be controlled or turn freely. Also supporting rollers 21 can be provided along the paths of the external passage of the bands.

The length of the lower band 7 should be, by preference, greater than that of band 6 so that the drum 10 will occupy a more advance position than drum 8. This particular arrangement will facilitate the introduction of the material to be treated. A variable speed control mechanism, represented by the rollers 22 and 23 controlled by a variable speed motor, ensures the introduction of the material between the bands, with tension, without tension or even with overfeeding.

The rewind spindle 24 or any other device for storing the strip material may be mounted at the delivery end of the chamber. The conduit 25 provides for the supply of vapour to the chamber 1.

The exhaust pipe 25a provided with a pressure valve for controllable delivery ensures the discharge of the excess gaseous fluid when the internal pressure exceeds the intended limit.

The two endless bands 6 and 7 preferably are made of thin stainless metal and the surfaces with which the edges of the strips 15 come into frictional contact should be polished.

The surfaces in contact with the material can be coated with an insulating material, such as "Teflon" or a polyester.

These bands also may be perforated. The extent of the perforations in a longitudinal direction shall be less than the width of the strips 15.

Alternatively these perforated bands may be covered with short pieces of metal or of some other non-perforated material by which the transverse edges will be covered.

Finally, it will be possible to cause two endless doublers to move between the metallic bands. The material being treated being passed between the two doublers so that it will not be brought into contact with the metallic surfaces of the bands.

FIGURE 3 shows a modified construction in which the bands separate after entering in the interior of the thermal chamber. This separation is achieved by a series of rollers 26, 27, 28 and 29, the bands after being guided by the rollers 30, 31, 32 and 33 again coming together in front of the outlet slit. The passage of the material is effected by means of two series of intermediary rollers 34, 35 with the result that the duration of the stay of the material in the interior of the enclosure at high pressure can thus be prolonged.

Figure 4:
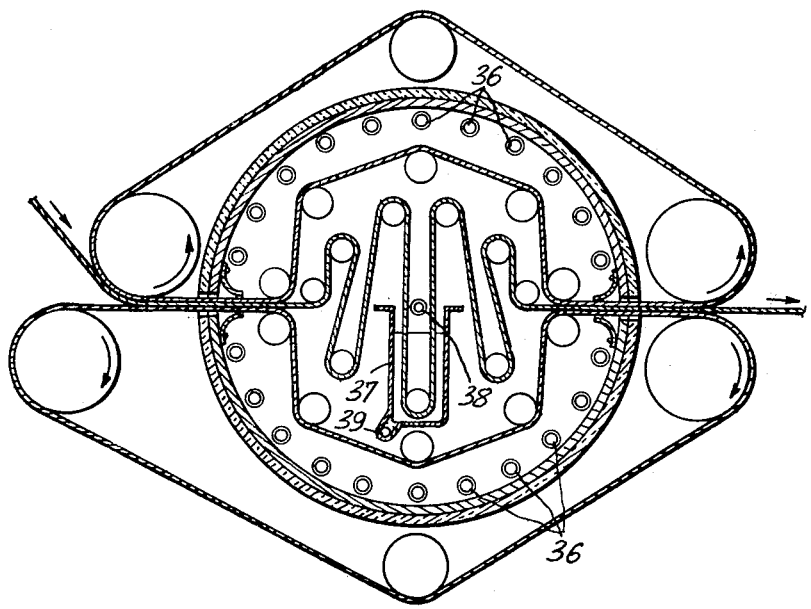
FIGURE 4 shows another variant in which the chamber is cylindrical.

FIGURE 4 shows another form of construction of the thermal chamber in which the internal arrangement is similar to that of FIGURE 3 but the heating of this chamber with cylindrical partitions is effected by means of heating elements 36 or the heating elements 36a as shown in FIGURE 1.

It is also possible to create a forced circulation of treatment fluids in the interior of the chamber by providing blowing means, comprising ventilators and blowing nozzles.

The operating means in FIGURES 1 and 2 preferably is used for the drying, the polymerising and the fixing of fabrics, papers and the like. The operating means shown in FIGURES 3 and 4 preferably is used for effecting operations of a chemical nature, such as the stripping, the boiling or the bleaching of fabrics of threads of cardboard, of cellulose and other strip material.

The chambers can be provided with an impregnation vat containing the solution 37 that is supplied through the conduit 38 and discharged through the draining conduit 39.

Figure 8:
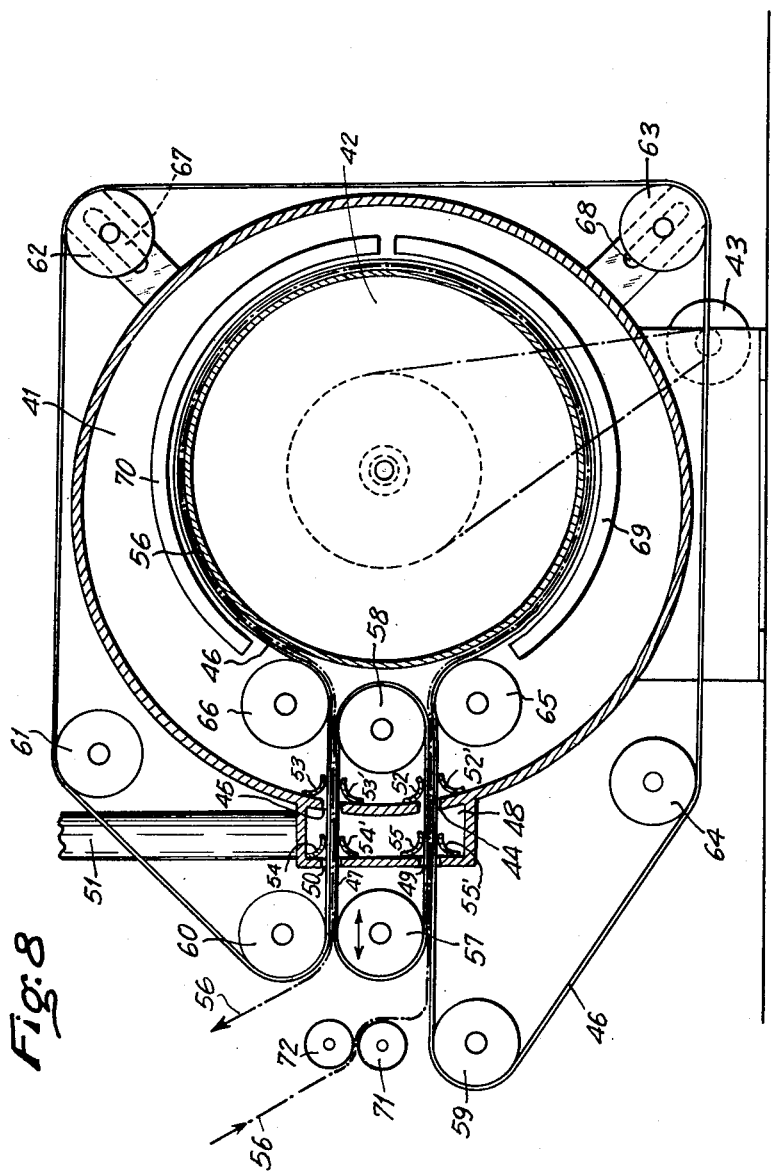
FIGURE 8 shows, in cross section, a modification of the thermal treatment chamber.

With regard to the modification shown in FIGURE 8, this is essentially characterised by the fact that the thermal chamber contains a rotating cylinder, provided with heating means, which is rotated by at least one of the conveyor bands, as well as by the material being treated.

The cylinder 42, provided with heating means arranged in the interior of the hollow cylindrical body is rotated in the interior of the heat insulated chamber 41, having a pressure that is different to that of the ambient atmospheric pressure. The cylinder is rotated by a motor 43.

The thermal chamber 41 is provided with two slits 44 and 45, giving passage to two endless bands 46 and 47.

The slits 44 and 45 are protected by an air lock 48 which is also provided with slits 49 and 50, traversed by the endless bands.

This air lock is provided with a discharge conduit 51 which ensures the evacuation of the gases which might have escaped from the chamber 41.

The four above-named slits are respectively provided with jointing elements 52—52', 53—53', 54—54', 55—55', which ensure the sealing of the respective slits and at the same time give passage to the superposed bands 45 and 46 when they enter and leave the terminal chamber.

FIGURE 8 shows a construction in which only the band 46 passes around the cylinder 42, the band 47, which is shorter, serving only to protect one of the surfaces of the material 56, during its passage through the slits 44—45 and 49—50. The travel of the band 47 is restricted by the roller 57, of adjustable position, located at the exterior of chamber 41, and the roller 58, located in the interior of such chamber.

The passage of the band 46 is effected by means of externally located rollers 59, 60, 61, 62, 63 and 64 and by the internally located rollers 65 and 66. The rollers 62 and 63 are adjustable and the displacement of their spindles in the slots 67 and 68 allows the tension of the band 46 to be regulated. When the cylinder is equipped with heating means it may be necessary to provide a simultaneous heating of the other surface of the product through the endless band 46. This heating is obtained by the elements 69 and 70 which can act by radiation, by convection or by any other suitable means, to heat the external surface of the endless band, the heat being transmitted by conduction to the external surface of the product 56.

The intake of the product 56 is assured at the entry of the machine by two controlled rollers 71 and 72, the linear speed of which can be modified by relating it to the linear speed of the bands 46 and 47, which enables, at will, the product to be presented stretched longitudinally or relaxed at the entry of the endless bands.

This chamber is completed by a direct vapour feed conduit, as well as by an outlet conduit for the gas out of the chamber, and finally, by various control apparatus.

I claim:

1. A device for treating materials comprising wall means defining a closed chamber having an inlet and an outlet opening, an upper conveyor band of slightly smaller width than said inlet and outlet openings trained to run into said inlet through said chamber and out said outlet, a lower conveyor band of slightly smaller width than said inlet and outlet openings trained to run through said chamber and out said outlet, means for feeding material to be treated between said upper and lower bands, means for introducing a treatment fluid under pressure into said chamber, and flexible means disposed on the interior of said chamber wall means adjacent said inlet and outlet openings and having portions extending from said wall means into contact with the outer surfaces of said upper and lower conveyor whereby the pressure difference between the inside and the outside of said chamber biases said flexible means into contact with said conveyor bands, said flexible means including semi-rigid spring members connected to said wall means above and below said inlet and outlet and extending downwardly and upwardly, respectively, into contact with said conveyor band, and a plastic member overlying said resilient member and having an outstanding portion extending therebeyond and into contact with said conveyor band.

2. A device for treating material comprising wall means defining a closed chamber having an inlet opening and an outlet opening, said openings each having a pair of substantially parallel edges, an upper conveyor band of a width slightly smaller than that of said inlet and outlet openings, trained to run through said inlet opening, into and through said chamber and out through said outlet opening, a lower conveyor band of a width slightly smaller than said inlet and outlet openings trained to run through said inlet opening, into and through said chamber and out through said outlet opening, said conveyor bands being superposed through said openings, means for feeding material to be treated between the inner surfaces of said upper and lower bands, said lower conveyor band having a width greater than the width of said upper conveyor band, means for introducing a treatment fluid under super-atmospheric pressure into said chamber, and sealing means disposed on the interior of said chamber wall means adjacent said inlet and outlet openings, each sealing means comprising a pair of flaps, at least equal in width to the associated opening and respectively above and below the associated opening, each flap having a fixed extreme edge, parallel to an edge of the opening, secured in fluid-tight relation to the inner surface of said wall means in spaced relation to the associated opening, each flap extending from its extreme fixed edge inwardly and toward a conveyor band and having a free extreme edge in fluid-tight engagement with the outer surface of a conveyor band, the pressure differential acting on said flaps between the extreme edges thereof maintaining said free edges in such fluid-tight engagement with the conveyor band surfaces.

3. A device for treating materials according to claim 2, wherein said sealing flaps are resilient members connected to said wall means above and below said inlet and outlet openings and respectively extending downwardly and upwardly therefrom into contact with said conveyor band, said resilient members having their free edges, in engagement with said conveyor band, made of a low friction material.

4. A device for treating materials according to claim 2, wherein said sealing flaps are rigid members pivotally connected to said wall means above and below each of said inlet and outlet openings and extending downwardly and upwardly, respectively, to a location adjacent said conveyor band, and a resilient member secured in juxtaposition to each rigid member and supported thereby, the end of each resilient member being urged into contact with a conveyor band.

5. A device for treating materials according to claim 4, wherein each of said rigid members is subdivided laterally into a plurality of relatively narrow strips.

References Cited in the file of this patent

UNITED STATES PATENTS

| | | |
|---|---|---|
| 890,252 | Thompson | June 9, 1908 |
| 1,471,671 | Voelker | Oct. 23, 1923 |
| 1,595,473 | Minton | Aug. 10, 1926 |
| 1,595,486 | Minton | Aug. 10, 1926 |
| 1,612,698 | Cohoe | Dec. 28, 1926 |
| 1,632,760 | Jones | June 14, 1927 |
| 1,878,236 | Griffin | Sept. 20, 1932 |
| 2,671,279 | Blanchard | Mar. 9, 1954 |
| 2,890,878 | Steinhertz et al. | June 16, 1959 |
| 2,986,911 | Jackson | June 6, 1961 |
| 2,986,912 | Richeson et al. | June 6, 1961 |